United States Patent
Xu

(10) Patent No.: US 12,258,747 B1
(45) Date of Patent: *Mar. 25, 2025

(54) QUICK-CLEANING DRAIN FOR QUICK REPLACEMENT OF CLEANING PARTS

(71) Applicant: Jianping Xu, Chaozhou (CN)

(72) Inventor: Jianping Xu, Chaozhou (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/892,939

(22) Filed: Sep. 23, 2024

Related U.S. Application Data

(63) Continuation of application No. 18/539,077, filed on Dec. 13, 2023, now Pat. No. 12,129,641.

(51) Int. Cl.
*E03F 5/04* (2006.01)
*B01D 29/11* (2006.01)
*B01D 29/96* (2006.01)

(52) U.S. Cl.
CPC .............. *E03F 5/041* (2013.01); *B01D 29/11* (2013.01); *B01D 29/96* (2013.01); *E03F 5/0407* (2013.01)

(58) Field of Classification Search
CPC .......... E03F 5/041; B01D 29/11; B01D 29/96
See application file for complete search history.

(56) References Cited

U.S. PATENT DOCUMENTS

| | | | |
|---|---|---|---|
| 6,537,447 B2 * | 3/2003 | Remon | E02D 29/12 210/163 |
| 8,409,433 B2 * | 4/2013 | Worth | E03F 5/06 422/255 |
| 12,129,641 B1 * | 10/2024 | Xu | B01D 29/11 |

* cited by examiner

*Primary Examiner* — Eric Keasel

(57) ABSTRACT

The present disclosure provides a quick-cleaning drain for quick replacement of cleaning parts, comprising a drain body, the drain body is provided with a quick-cleaning mechanism which is quickly removable, the quick-cleaning mechanism comprises a lifting rod and a quick-cleaning member, the upper surface of the quick-cleaning member is provided with a connecting end, the bottom of the lifting rod is provided with an engaging end matching the connecting end, and the engaging end is removably fixed to the connecting end. The quick-cleaning member can be discarded directly and replaced with a new one during cleaning, so that when the quick-cleaning member carrying dirt and debris is separated and drops, the dirt and debris can drop synchronously, completely avoiding touch of the dirt and debris by a cleaning person, and making it low-cost and easy to use.

20 Claims, 11 Drawing Sheets

QUICK-CLEANING DRAIN FOR QUICK REPLACEMENT OF CLEANING PARTS

CROSS-REFERENCE TO RELATED APPLICATIONS

This application is a continuation of U.S. application Ser. No. 18/539,077, entitled "QUICK-CLEANING DRAIN FOR QUICK REPLACEMENT OF CLEANING PARTS," filed Dec. 13, 2023, and the entire contents of which are incorporated herein by reference.

TECHNICAL FIELD

This application relates to drain, and specifically relates to a quick-cleaning drain for quick replacement of cleaning parts.

BACKGROUND

Drain is a draining apparatus used on the ground to connect with the draining pipe system, which is an important interface connecting the draining pipe system and the indoor ground. As an important part of the draining system in the residence, its performance has a direct impact on the quality of indoor air, and is very important for controlling the odor in the bathrooms.

For better odor control and draining effect of the drain, users tend to use the drain cores which can match with each other and have better effect, and users can directly replace the drain cores if damaged in use, without removing the drain, which can avoid the trouble of removing and installing the drains.

Floor drains are often used in bathrooms, where hair and other debris are easy to appear, in order to avoid clogging of the drainage, such debris needs to be blocked in order to avoid its inflow into the drainage causing clogging of the drainage, therefore, most floor drains are equipped with filter parts, some of which are panel filter parts directly covering the floor drains, however, if the panel filter is used alone, hair and other long, thin strips cannot be effectively blocked, and clogging of the drain is still a problem. Generally, floor drains have flat panels that cannot be used for storing rubbish, so it is easy for rubbish to accumulate, and therefore the rubbish needs to be cleaned frequently. Sometimes the floor drain is used once but needs to be cleaned many times, for example, when a woman takes a bath and washes her hair at the same time, due to the accumulation of fallen hair, the floor drain panel is easily clogged, and the drainage is significantly affected, and the floor drain panel needs to be cleaned in time so that it can be used for draining and for use normally

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a quick-cleaning drain for quick replacement of cleaning parts comprises a drain body, the drain body is provided with a quick-cleaning mechanism which is quickly removable, the quick-cleaning mechanism matches a draining channel of the drain body, the quick-cleaning mechanism comprises a quick-cleaning member and a lifting rod, the quick-cleaning member matches the draining channel for draining water and blocking debris in the water, the upper surface of the quick-cleaning member is provided with a connecting end, and the bottom of the lifting rod is provided with an engaging end matching the connecting end.

One of the connecting end and the engaging end is provided with a magnet, the other is provided with a magnet or a magnetically attractable part, and the engaging end is removably fixed to the connecting end through magnetic connection.

Specifically, the quick-cleaning drain further comprises a drain core, the drain core is embedded in the draining channel of the drain body, and the quick-cleaning mechanism is provided in a cavity in the drain core and is quickly removable from the drain core.

Specifically, the cavity in the drain core is provided with a drain basket, the drain basket matches the draining channel, the quick-cleaning mechanism is movably provided in the drain basket and matches on the bottom of the inner surface of the drain basket, and the quick-cleaning mechanism matches the drain basket for draining water.

Specifically, the top wall, the side wall and the bottom wall of the drain basket are all provided with draining holes; and/or the top of the drain basket is provided with a handle.

Specifically, the lifting rod is hollow inside and mounted with an aromatherapy bar. The aromatherapy bar is removably fixed in the lifting rod, and the lifting rod is provided with opening holes for odor of the aromatherapy bar to come out.

Specifically, the upper surface of the drain body has a drain panel, the drain panel is provided with a quick-cleaning hole provided above the quick-cleaning mechanism, the quick-cleaning hole is larger in area than the quick-cleaning mechanism to enable the quick-cleaning mechanism to be removed directly through the quick-cleaning hole, and the top of the lifting rod is provided with a decorative cover matching the quick-cleaning hole. When the quick-cleaning mechanism is mounted in the drain body, the decorative cover is provided in the quick-cleaning hole and is provided with opening holes for the odor of the aromatherapy bar to come out.

A quick-cleaning drain for quick replacement of cleaning parts comprises a drain body, the drain body is provided with a quick-cleaning mechanism which is quickly removable, the quick-cleaning mechanism matches a draining channel of the drain body, the quick-cleaning mechanism comprises a quick-cleaning member and a lifting rod, the quick-cleaning member matches the draining channel for draining water and blocking debris in the water, the upper surface of the quick-cleaning member is provided with a connecting end, and the bottom of the lifting rod is provided with an engaging end matching the connecting end.

The connecting end is a convex column protruding from the upper surface of the quick-cleaning member, and the engaging end is a cavity in the bottom of the lifting rod matching the convex column.

Specifically, the convex column has an engaging rail surrounding the axis of the convex column, and the side wall of the cavity is provided with an engaging groove matching the engaging rail.

Specifically, the quick-cleaning drain further comprises a drain core, the drain core is embedded in the draining channel of the drain body, and the quick-cleaning mechanism is provided in a cavity in the drain core and is quickly removable from the drain core.

Specifically, the cavity in the drain core is provided with a drain basket, the drain basket matches the draining channel, the quick-cleaning mechanism is movably provided in the drain basket and matches on the bottom of the inner surface of the drain basket, and the quick-cleaning mechanism matches the drain basket for draining water.

Specifically, the top wall, the side wall and the bottom wall of the drain basket are provided with draining holes; and/or the top of the drain basket is provided with a handle.

Specifically, the lifting rod is hollow inside and mounted with an aromatherapy bar, the aromatherapy bar is removably fixed in the lifting rod, and the lifting rod is provided with opening holes for odor of the aromatherapy bar to come out.

Specifically, the upper surface of the drain body has a drain panel, the drain panel is provided with a quick-cleaning hole provided above the quick-cleaning mechanism, the quick-cleaning hole is larger in area than the quick-cleaning mechanism to enable the quick-cleaning mechanism to be removed directly through the quick-cleaning hole, and the top of the lifting rod is provided with a holding part for holding.

A quick-cleaning drain for quick replacement of cleaning parts comprises a drain body, the drain body is provided with a quick-cleaning mechanism which is quickly removable, the quick-cleaning mechanism matches a draining channel of the drain body, the quick-cleaning mechanism comprises a quick-cleaning member and a lifting rod, the quick-cleaning member matches the draining channel for draining water and blocking debris in the water, the upper surface of the quick-cleaning member is provided with a connecting end, and the bottom of the lifting rod is provided with an engaging end matching the connecting end.

The connecting end is an engaging column provided on the upper surface of the quick-cleaning member, the lifting rod is hollow inside and embedded with an engaging mechanism, the engaging mechanism comprises an engaging member and a controller, the engaging member is provided in the bottom of the lifting rod for selectively engaging or unengaging the engaging column, and the controller is provided in the lifting rod for controlling the engaging or unengaging of the engaging member.

Specifically, a support ring is provided at the inner wall of the lifting rod, the controller is mounted to the support ring and extends downwardly from the support ring for connecting to the engaging member, the engaging member comprises two symmetrically arranged engaging teeth and a hinge member, the upper end of each said engaging tooth is provided with a hinge head, the two said hinge heads respectively on each of the two said engaging teeth are staggered from each other and are fixed to the hinge member using a pin, each of said two hinge heads has a limiting hole and an engaging hole on its surface facing to the other, two said limiting holes are embedded with an engaging spring, and two said engaging holes match and enclose the engaging column.

Specifically, the controller comprises a controlling member and a controlling spring, the controlling spring is embedded between the controlling member and the support ring and is supported by the support ring, a connecting rod extending towards the support ring is provided in the center of the controlling member, the bottom of the connecting rod is fixedly connected to the top of the hinge member, the controlling member is embedded in and is partially outside of the lifting rod and the controlling spring supports the controlling member to reset after being pressed down in the lifting rod.

Specifically, the drain body is provided with a drain panel on the upper surface, the drain panel is provided with a quick-cleaning hole located above the quick-cleaning mechanism, the quick-cleaning hole is larger in area than the quick-cleaning mechanism, the quick-cleaning mechanism is removable directly through the quick-cleaning hole, and the top of the lifting rod is provided with a decorative cover matching the quick-cleaning hole. When the quick-cleaning mechanism is installed in the drain body, the decorative cover is located in the quick-cleaning hole, the decorative cover is provided with an operating hole and the controller conducts operations through the operating hole.

Specifically, the operating hole is provided with a pushing block, the pushing block is embedded in the operating hole and can slide in the operating hole, the controller is located below the decorative cover, the lower end of the pushing block is arranged as an inverted triangle, the bottom of the pushing block matches the top end of the controller, the pushing block controls the controller to conduct operations.

Specifically, the quick-cleaning drain further comprises a drain core, the drain core is embedded in the draining channel of the drain body, and the quick-cleaning mechanism is provided in a cavity in the drain core and is quickly removable from the drain core.

Specifically, the cavity in the drain core is provided with a drain basket, the drain basket matches the draining channel, the quick-cleaning mechanism is movably provided in the drain basket and matches on the bottom of the inner surface of the drain basket, the quick-cleaning mechanism matches the drain basket for draining water, and the top wall, the side wall and the bottom wall of the drain basket are all provided with draining holes; and/or the top of the drain basket is provided with a handle.

The above aspects or examples and advantages, as well as other aspects or examples and advantages, will become apparent from the ensuing description and accompanying drawings.

BRIEF DESCRIPTION OF THE DRAWINGS

The drawings constituting a part of the present application are used to provide a further understanding of the present disclosure. Schematic embodiments of the present disclosure and their descriptions are used to explain the present disclosure and do not constitute improper limitations to the present disclosure. In the drawings.

Figure 1:
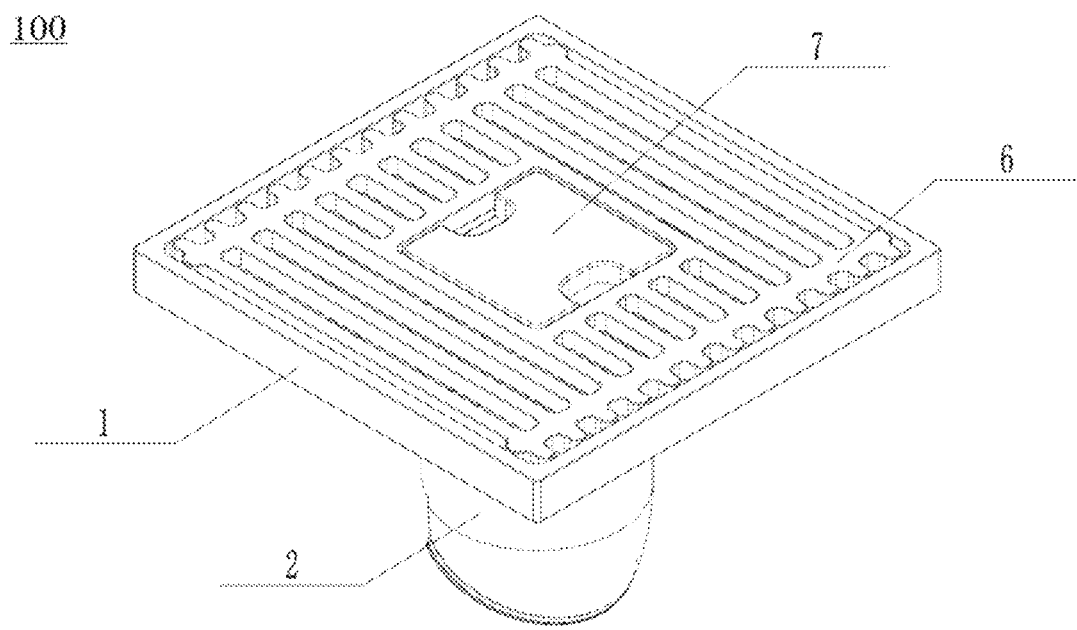
FIG. 1 is a schematic structural diagram of a quick-cleaning drain for quick replacement of cleaning parts according to embodiment 1 of the present application.
Figure 2:
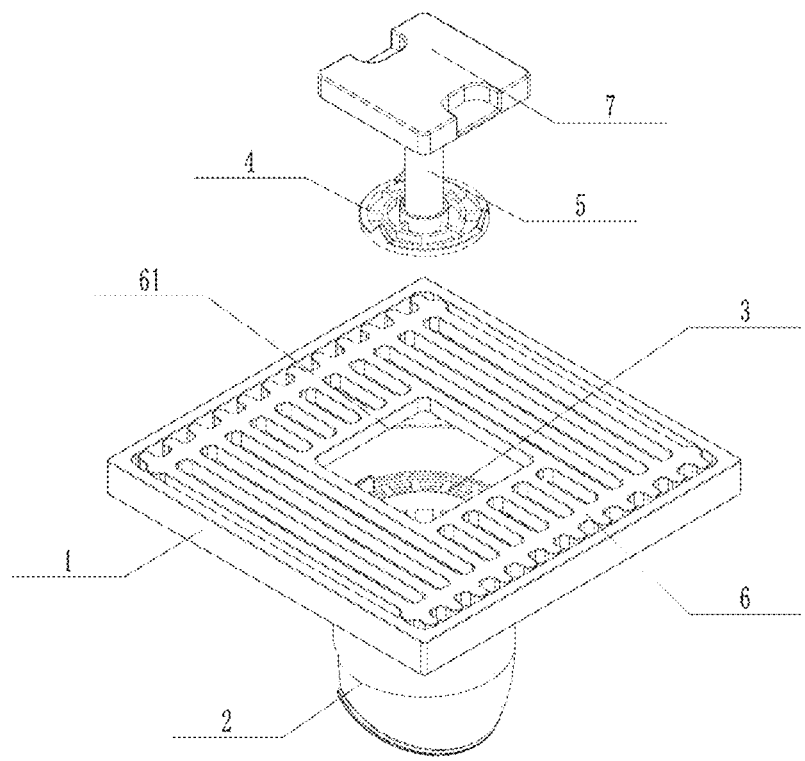
FIG. 2 is a schematic diagram of a state in which a quick-cleaning mechanism is taken out according to embodiment 1 of the present application.

Description of reference signs: 100—quick-cleaning drain; 1—drain body; 2—drain core; 3—drain basket; 400—quick-cleaning mechanism; 4—quick-cleaning member; 41—iron piece; 42—convex column; 43—engaging rail; 44—engaging column; 45—connecting end; 46—engaging end; 5—lifting rod; 51—magnet; 52—cavity; 53—engaging groove; 54—support ring; 55—controlling member; 551—connecting rod; 56—controlling spring; 57—hinge member; 58—engaging tooth; 581—hinge head; 582—limiting hole; 583—engaging hole; 59—engaging spring; 510—engaging mechanism; 511—engaging member; 512—controller; 513—pin; 6—drain panel; 61—quick-cleaning hole; 7—decorative cover; 71—operating hole; 72—pushing block; 8—aromatherapy bar; 9—draining channel.

DETAILED DESCRIPTION OF THE EMBODIMENTS

The present disclosure will be described in detail below with reference to the accompanying drawings and in conjunction with embodiments. The various examples are provided by way of interpretation of the present disclosure and not limiting the present disclosure. Indeed, it will be apparent to those skilled in the art that modifications and variations may be made in the present disclosure without departing from the scope or spirit of the present disclosure. For example, features shown or described as part of one embodiment may be used in another embodiment to produce yet another embodiment. It is therefore desirable that the present disclosure encompasses such modifications and variations falling within the scope of the appended claims and their equivalents.

In the description of the present disclosure, the terms "longitudinal", "transverse", "up", "down", "front", "back", "left", "right", "vertical", "horizontal", "top", "bottom" and the like denote orientation or positional relationships based on those shown in the drawings, are intended for ease of description of the present disclosure only and not to require that the present disclosure must be constructed and operated in a particular orientation, and therefore cannot be construed as a limitation to the present disclosure. The terms "connected", "connection", and "arranged" used in the present disclosure should be understood in a broad sense, for example, which may refer to a fixed connection or a detachable connection; which may refer to a direct connection or an indirect connection through an intermediate component; which may refer to a wired electrical connection, a radio connection, or a wireless communication signal connection, and the specific meanings of the above terms may be understood by those of ordinary skill in the art according to a specific situation.

One or more examples of the present disclosure are shown in the accompanying drawings. The detailed description uses numeric and letter designations to refer to features in the drawings. Similar or like reference signs in the drawings and descriptions have been used to refer to similar or like parts of the present disclosure. As used herein, the terms "first", "second", "third" and the like are used interchangeably to distinguish one member from another and are not intended to denote the location or importance of the individual member.

A quick-cleaning drain 100 for quick replacement of cleaning parts is shown in FIGS. 1-5 for embodiment 1 of the present invention, which comprises a drain body 1, the drain body 1 is embedded with a drain core 2, the drain core 2 is provided with a quick-cleaning mechanism 400 for quick removal, the quick-cleaning mechanism 400 matches a draining channel of the drain core 2, the quick-cleaning mechanism 400 comprises a lifting rod 5 and a quick-cleaning member 4, the quick-cleaning member 4 matches the draining channel for draining water and blocking the debris in the water, the upper surface of the quick-cleaning member 4 is provided with a connecting end 45, and the bottom of the lifting rod 5 is provided with an engaging end 46, and the engaging end 46 matches and is removably fixed to the connecting end 45. Preferably, the quick-cleaning member 4 is designed to be disposable, which is directly formed using low-cost materials, and is low-cost and easy to use. Via the blocking in the draining channel by the quick-cleaning mechanism 400, the debris accumulates on the quick-cleaning mechanism 400, and then when the quick-cleaning mechanism 400 is removed, the debris can be removed altogether for quick cleaning, at the same time, to avoid the difficulty of cleaning the quick-cleaning mechanism 400, the quick-cleaning member 4 is directly designed to be removable, so that the quick-cleaning member 4 can be removed directly during the cleaning process, and all the debris can be removed from the lifting rod 5, for quick cleaning, subsequently the quick-cleaning member 4 is replaced with a new one, resulting in quick replacement of the cleaning parts which is a solution for the technical problem of the present application.

Specifically, the drain core 2 is provided with a drain basket 3, the drain basket 3 matches the draining channel, the quick-cleaning mechanism 400 is provided in the drain basket 3 and matches the bottom of the inner surface of the drain basket 3, and the quick-cleaning mechanism 400 matches the drain basket 3 for draining water.

It can be understood that in this embodiment, the cross-sections of the drain basket 3 and the quick-cleaning member 4 are in a circular shape. In other embodiments, the cross-sections of the drain basket 3 and the quick-cleaning member 4 may also be in a square shape, a triangular shape, or other shape.

Figure 3:
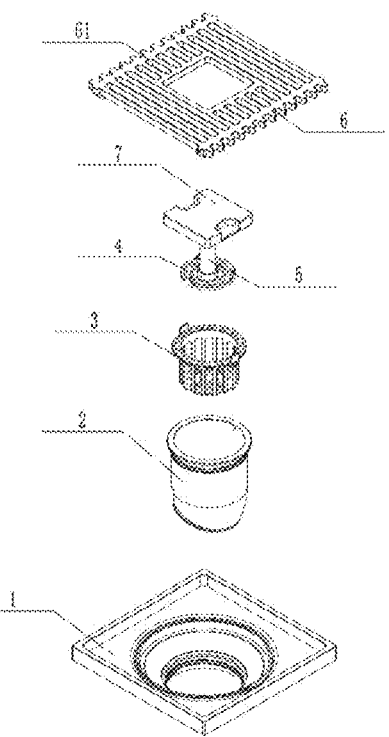
FIG. 3 is an exploded view of the quick-cleaning drain for quick replacement of cleaning parts according to embodiment 1 of the present application.
Figure 4:
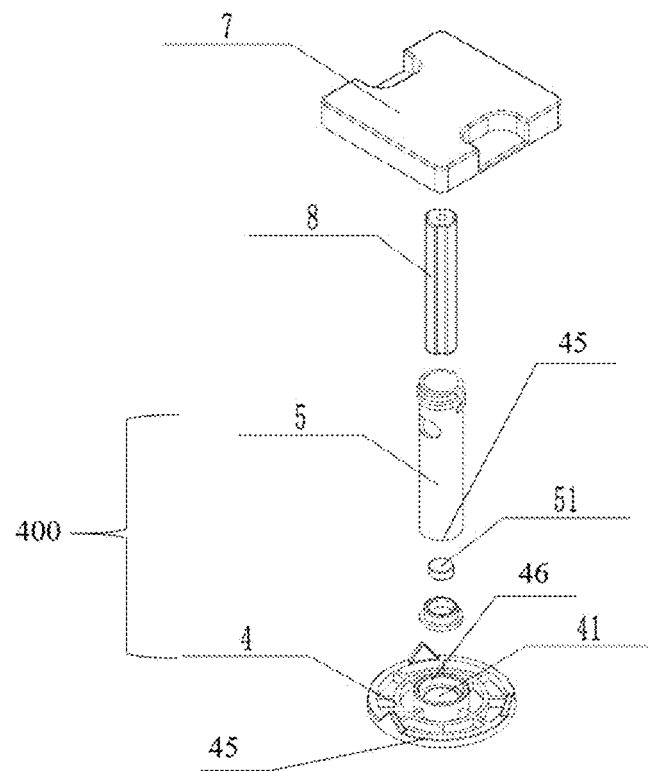
FIG. 4 is an exploded view of the quick-cleaning mechanism according to embodiment 1 of the present application.
Figure 5:
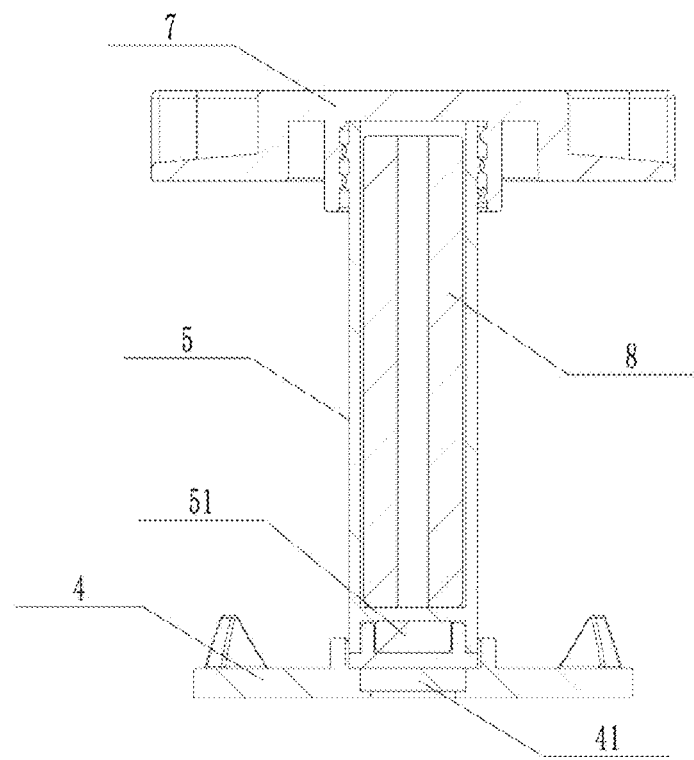
FIG. 5 is a section view of the quick-cleaning mechanism according to embodiment 1 of the present application.

FIG. 3 illustrates that the top wall, the side wall and the bottom wall of the drain basket 3 are provided with draining holes, so that the quick-cleaning drain can form a siphon effect during draining, making it easier for hair and the like to wrap around the quick-cleaning member 4, resulting in convenient cleaning. The top of the drain basket 3 is provided with a handle for easy lifting. In this embodiment, the drain basket 3 is designed so that, in particular, the side wall and the bottom wall of the drain basket 3 are provided with draining holes, enabling draining water through the draining holes, improving the efficiency of the draining water, and also avoiding the problem of blocking in the draining channel when blocking occurs in the quick-cleaning member 4 because just the quick-cleaning mechanism 400 is provided, moreover, the drain basket 3 is directly mounted in the drain core 2, which is capable of supporting the quick-cleaning mechanism 400, without modifying the drain core 2 by providing a supporting part for supporting the quick-cleaning mechanism 400, so that the quick-cleaning mechanism 400 is capable of being directly applied to the current drain core 2.

The engaging end is removably fixed to the connecting end through magnetic connection. One of the connecting end and the engaging end is provided with a magnet 51, the other is provided with a magnet 51 or a magnetically attractable part, and the magnetically attractable part may be made of metal material or non-metal material. In this embodiment, specifically, the connecting end 45 is an iron piece 41 which is formed into an integral structure with the quick-cleaning member 4 or embedded in the upper surface of the quick-cleaning member 4, and the engaging end 46 is a magnet 51 embedded in the bottom of the lifting rod 5, and the magnet 51 attracts the iron piece 41, By means of the attraction between the magnet 51 and the iron piece 41, the lifting rod 5 is connected to the quick-cleaning member 4, and when cleaned up, the quick-cleaning member 4 only needs to be hung on the side wall of the garbage bin and pulled, so that the quick-cleaning member 4 can be disconnected from the lifting rod 5 directly for the purpose of quick cleaning, and the replacement of a new quick-cleaning member 4 is easier and is accomplished by directly aligning and attracting the quick-cleaning member 4. Possible ways of mounting magnet 51 are to close the end directly after the magnet 51 has been placed and to cover the end with a cap. The entire quick-cleaning member 4 is formed in one possible way by directly pressing the iron sheet 41 into shape, and in another possible way by embedding a small iron piece 41 in plastic material.

Preferably, the lifting rod 5 is hollow inside and is provided with an aromatherapy bar 8, the aromatherapy bar 8 is removably fixed in the lifting rod 5, and the lifting rod 5 is provided with opening holes for odor of the aromatherapy bar 8 to come out.

The upper surface of the drain body 1 is provided with a drain panel 6, the drain panel 6 is provided with a quick-cleaning hole 61 above the quick-cleaning mechanism 400, the quick-cleaning hole 61 is larger in area than the quick-cleaning mechanism 400, the quick-cleaning mechanism 400 is capable of being taken out directly through the quick-cleaning hole 61, the top of the lifting rod 5 is provided with a decorative cover 7 matching the quick-cleaning hole 61, and when the quick-cleaning mechanism 400 is placed in the drain core 2, the decorative cover 7 is placed in the quick-cleaning hole 61 and the upper surface of the decorative cover 7 is flush with the upper surface of the drain panel 6. Certainly, the decorative cover 7 may also be arranged not to be flush with the upper surface of the drain panel 6, which can be freely set by the manufacturer as required. Via the quick-cleaning hole 61, when the quick-cleaning mechanism 400 needs to be cleaned up the drain can be taken out directly without demounting it, resulting in quick cleaning, via the decorative cover 7, even if the drain panel 6 is provided with the quick-cleaning holes 61, the drain panel 6 still has a good appearance with the help of the decorative cover 7, making the panel look more integral, more delicate and more attractive, at the same time, the decorative cover 7 is optionally connected to the quick-cleaning mechanism 400, which allows taking out the decorative cover 7 while simultaneously taking out the quick-cleaning mechanism 400 from the quick-cleaning holes 61, resulting in more convenient cleaning. The decorative cover 7 is provided with opening holes for the odor of the aromatherapy bar 8 to come out.

Figure 6:
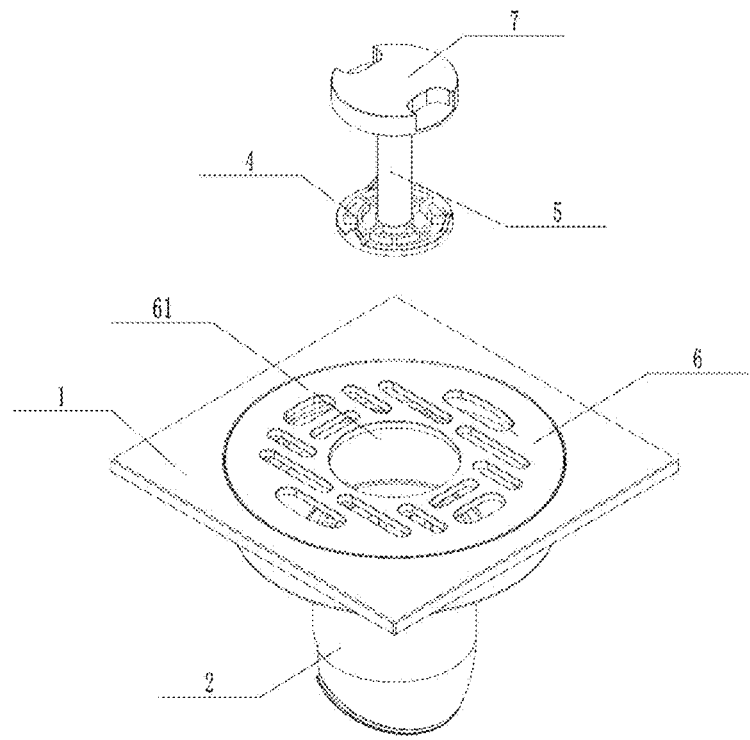
FIG. 6 is a schematic diagram of a state in which a quick-cleaning mechanism is taken out according to embodiment 2 of the present application.
Figure 7:
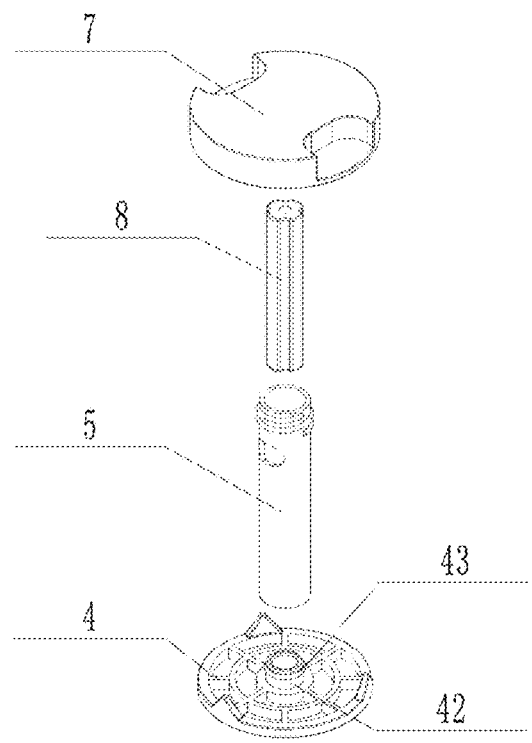
FIG. 7 is an exploded view of the quick-cleaning mechanism according to embodiment 2 of the present application.
Figure 8:
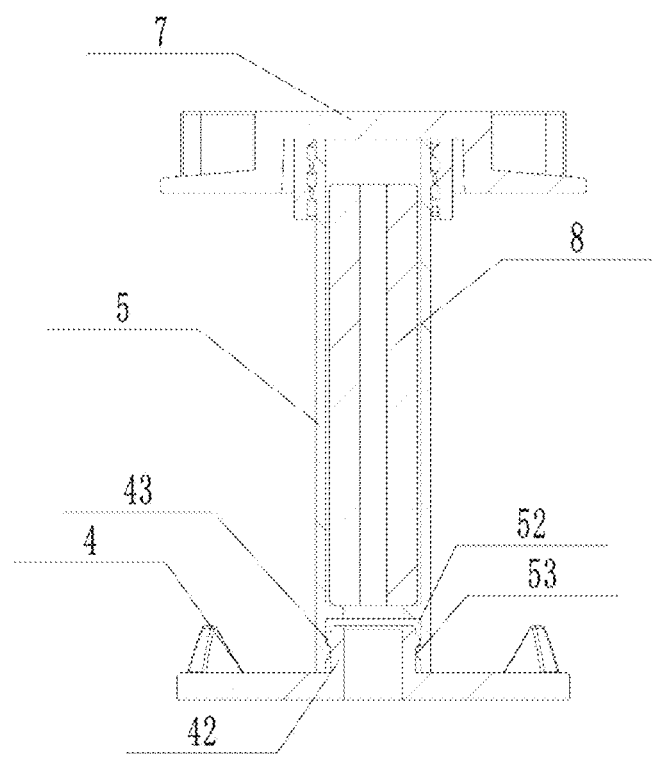
FIG. 8 is a section view of the quick-cleaning mechanism according to embodiment 2 of the present application.

Embodiment 2 is basically the same as embodiment 1, and the difference is that, as shown in FIGS. 6-8, the connecting end 45 is a convex column 42 protruding from the upper surface of the quick-cleaning member 4, the convex column 42 has an engaging rail 43 surrounding the convex column 42, the engaging end 46 is a cavity 52 in the bottom of the lifting rod 5 matching the convex column 42, and the side wall of the cavity 52 is provided with an engaging groove 53 matching the engaging rail 43. In this embodiment, via the combination of the engaging rail 43 and the engaging groove 53 on the convex column 42, the quick-cleaning member 4 is connected to the lifting rod 5, and because the transition portion between the engaging rail 43 and the engaging groove 53 is designed to be curved, the engagement and separation of the engaging rail 43 and the engaging groove 53 are relatively smooth, which can be disassembled by the external pulling force from the wall of the garbage bin, and can be assembled directly by alignment and pressing, resulting in a simple overall structure as well as convenience and quickness of use.

Figure 9:
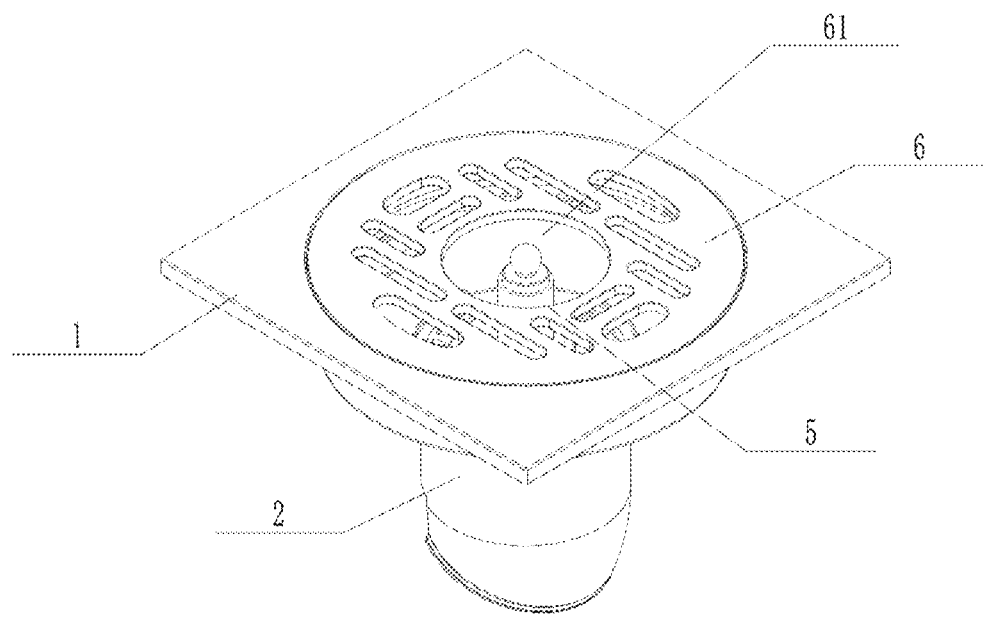
FIG. 9 is a schematic structural diagram of a quick-cleaning drain for quick replacement of cleaning parts according to embodiment 3 of the present application.
Figure 10:
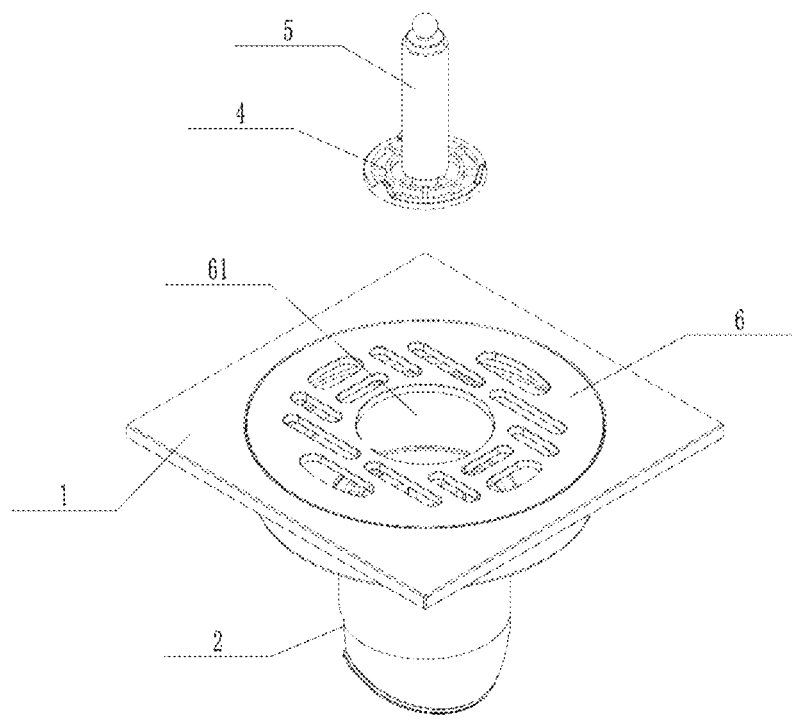
FIG. 10 is a schematic diagram of a state in which a quick-cleaning mechanism is taken out according to embodiment 3 of the present application.
Figure 11:
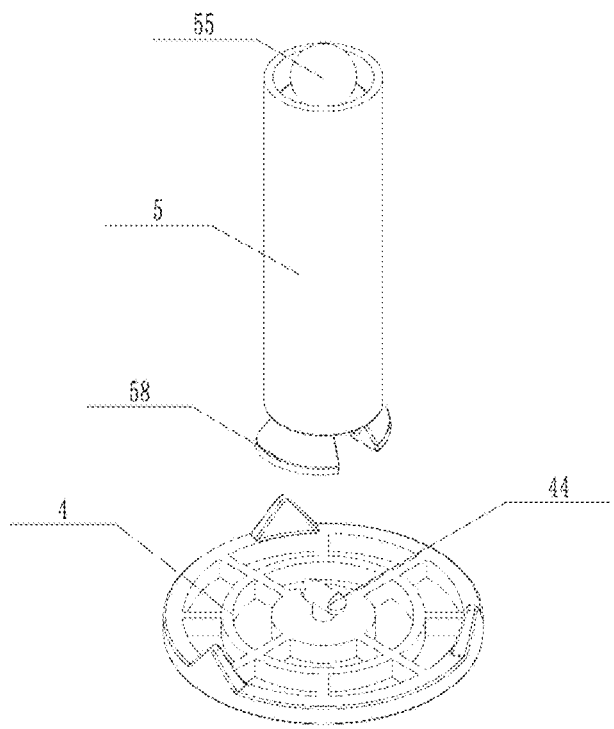
FIG. 11 is a schematic diagram of a state in which a quick-cleaning member is being mounted/dismounted from the quick-cleaning mechanism according to embodiment 3 of the present application.
Figure 12:
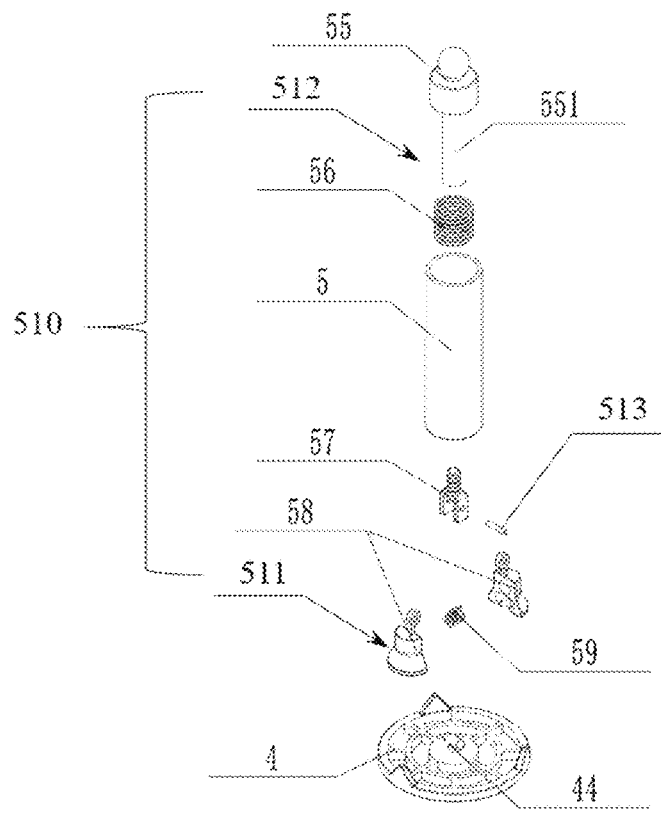
FIG. 12 is an exploded view of the quick-cleaning mechanism according to embodiment 3 of the present application.
Figure 13:
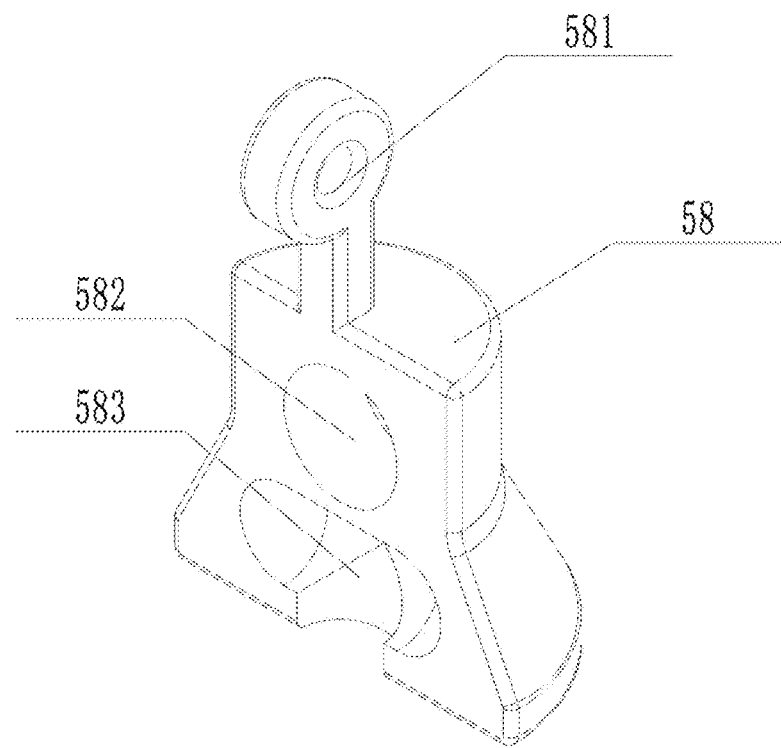
FIG. 13 is a schematic structural diagram of an engaging tooth according to embodiment 3 of the present application.
Figure 14:
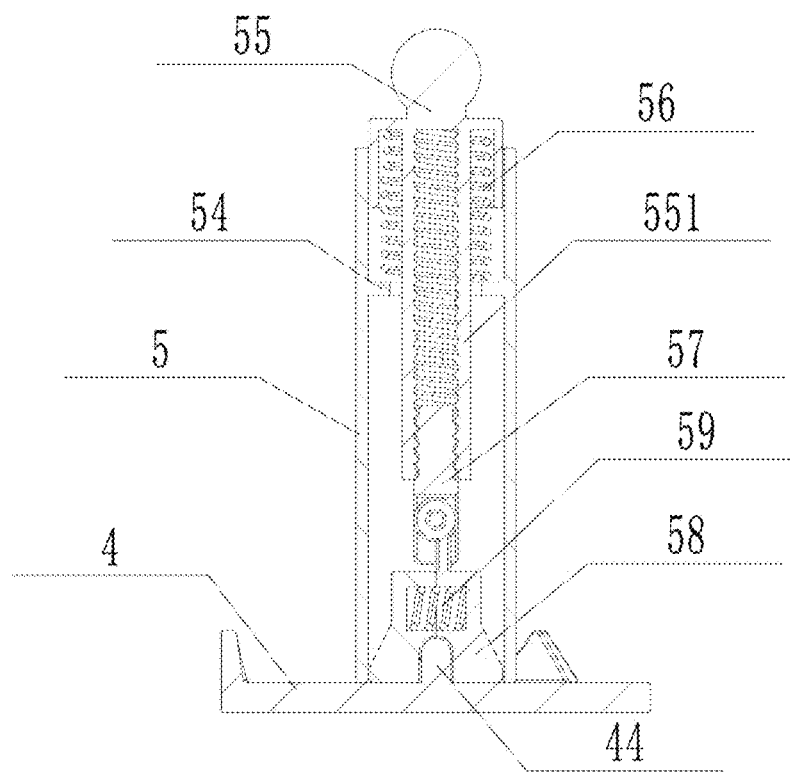
FIG. 14 is a section view of the quick-cleaning mechanism according to embodiment 3 of the present application.
Figure 15:
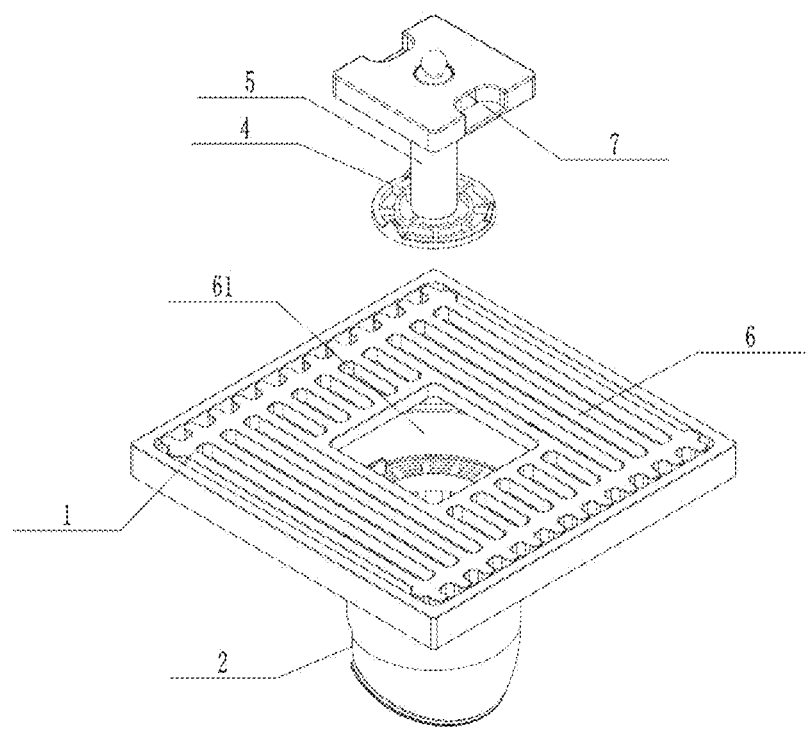
FIG. 15 is a schematic diagram of a state in which a quick-cleaning mechanism is taken out according to embodiment 4 of the present application.
Figure 16:
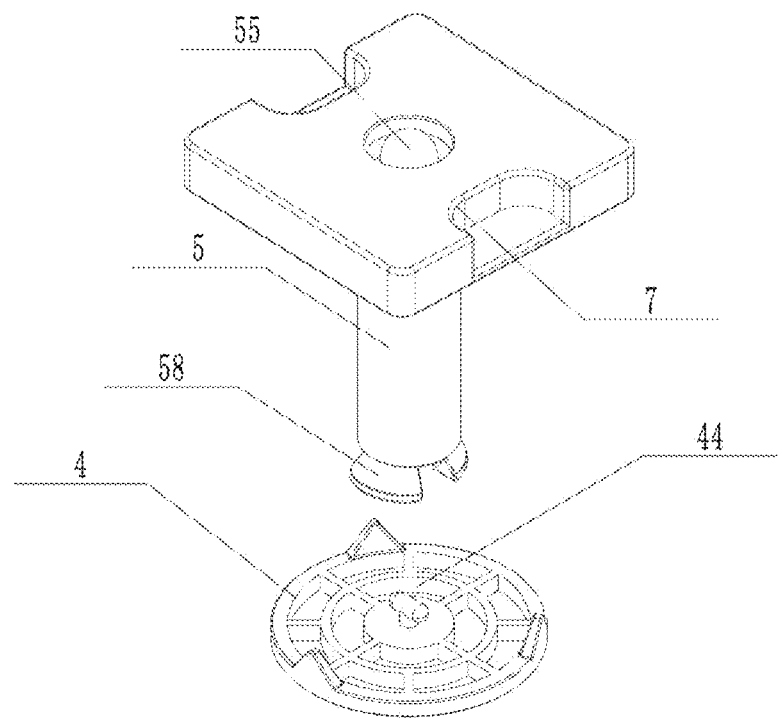
FIG. 16 is a schematic diagram of a state in which a quick-cleaning member is being mounted/dismounted from the quick-cleaning mechanism according to embodiment 4 of the present application.
Figure 17:
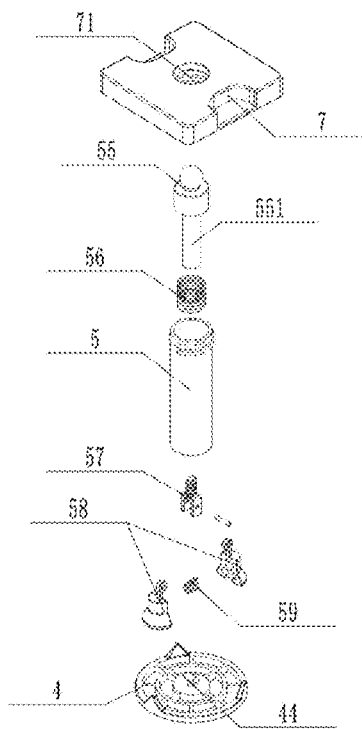
FIG. 17 is an exploded view of the quick-cleaning mechanism according to embodiment 4 of the present application.
Figure 18:
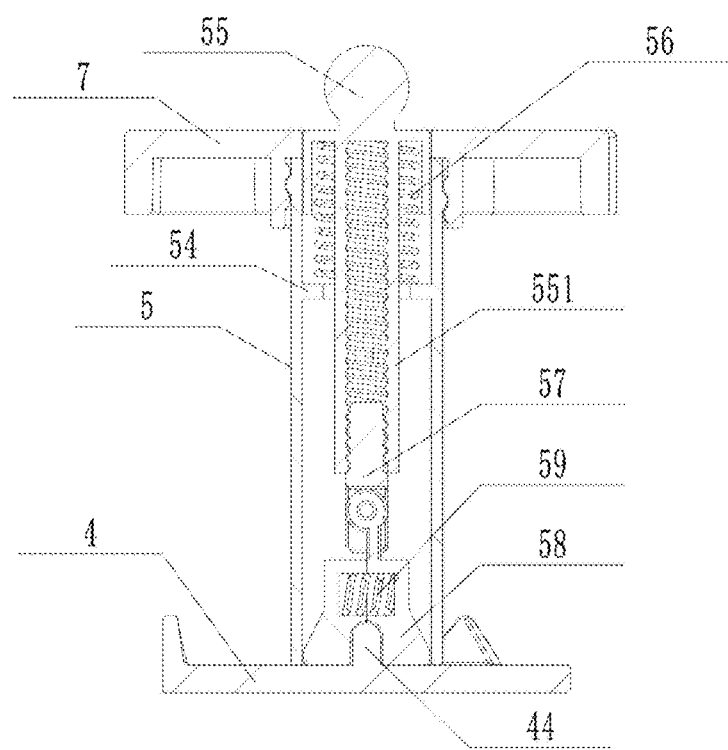
FIG. 18 is a section view of the quick-cleaning mechanism according to embodiment 4 of the present application.
Figure 19:
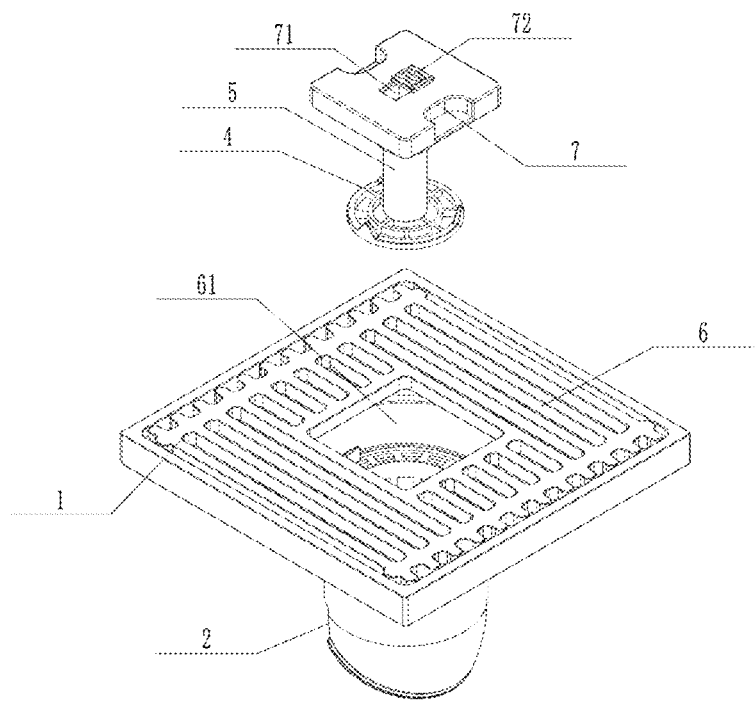
FIG. 19 is a schematic diagram of a state in which a quick-cleaning mechanism is taken out according to embodiment 5 of the present application.
Figure 20:
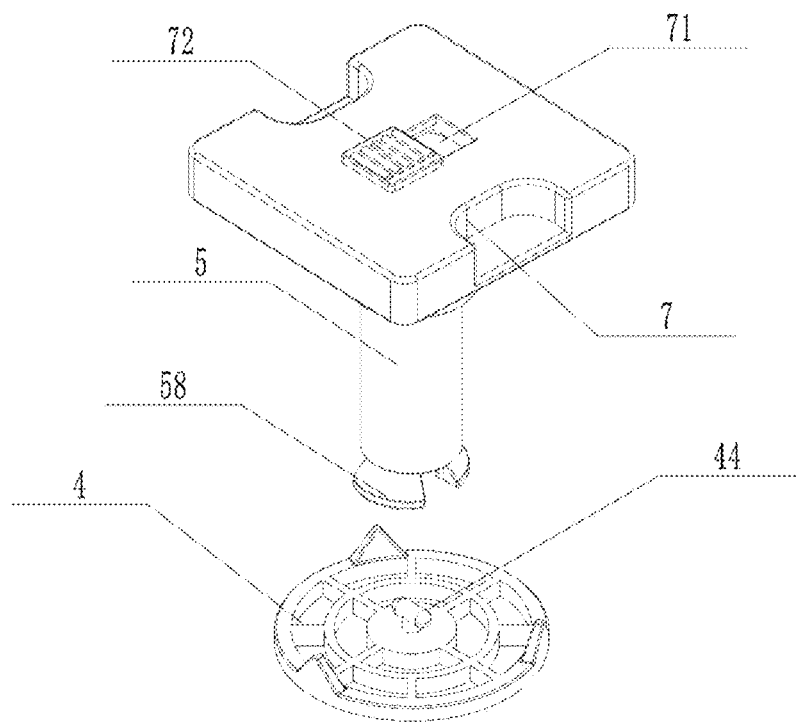
FIG. 20 is a schematic diagram of a state in which a quick-cleaning member is being mounted/dismounted from the quick-cleaning mechanism according to embodiment 5 of the present application.
Figure 21:
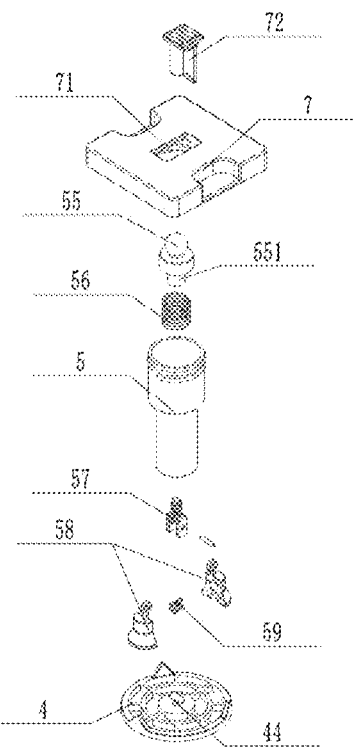
FIG. 21 is an exploded view of the quick-cleaning mechanism according to embodiment 5 of the present application.
Figure 22:
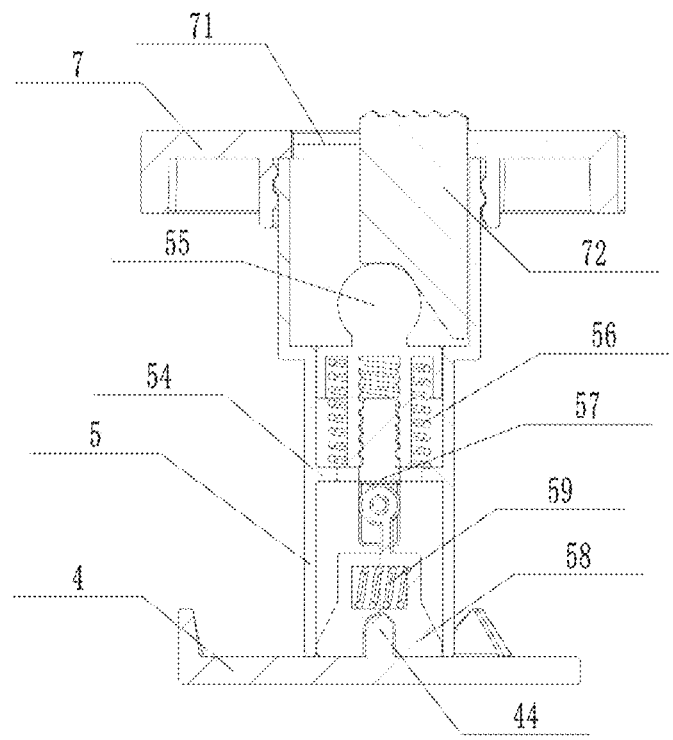
FIG. 22 is a section view of the quick-cleaning mechanism according to embodiment 5 of the present application.

Embodiment 3 is basically the same as embodiment 1, with the following differences: specifically, as shown in FIGS. 9-14, the connecting end 45 is an engaging column 44 provided on the upper surface of the quick-cleaning member 4, the lifting rod 5 is hollow inside and embedded with an engaging mechanism 510, the engaging mechanism 510 comprises an engaging member 511 and a controller 512, the engaging member 511 is provided in the bottom of the lifting rod for selectively engaging or unengaging the engaging column, and the controller 512 is provided in the lifting rod for controlling the engaging or unengaging of the engaging member 511. Via the combination of the engaging member 511 and the engaging column 44, and via the control of the controller 512, the quick-cleaning member 4 can be dismounted and mounted, and due to this design, the quick-cleaning member 4 is removed without the help of other external forces, and simply by operating the controller 512, resulting in smoother overall use, better practicability and experience of use. FIGS. 9 and 10 illustrate that the top of the lifting rod 5 is provided with a holding part for holding, which is a spherical handle. In addition, the holding part may also be arranged in other shapes.

Further, a support ring is provided at the inner wall of the lifting rod, the controller 512 is mounted to the support ring and extends downwardly from the support ring for connecting to the engaging member 511, the engaging member 511 comprises two symmetrically arranged engaging teeth and a hinge member, the upper end of each the engaging tooth provided with a hinge head, the two the hinge heads respectively on each of the two the engaging teeth are staggered from each other and are fixed to the hinge member using a pin 513, each of the two hinge heads has a limiting hole and an engaging hole on its surface facing to the other, two the limiting holes are embedded with an engaging spring, and two the engaging holes match and enclose the engaging column. Furthermore, the controller 512 comprises a controlling member and a controlling spring, the controlling spring is embedded between the controlling member and the support ring and is supported by the support ring, the controller 512 comprises a controlling member and a controlling spring, the controlling spring is embedded between the controlling member and the support ring and is supported by the support ring, a connecting rod extending towards the support ring is provided in the center of the controlling member, the bottom of the connecting rod is fixedly connected to the top of the hinge member, the controlling member is embedded in and is partially outside of the lifting rod and the controlling spring supports the controlling member to reset after being pressed down in the lifting rod. In this embodiment, by the engagement between the two engaging teeth 58, the engaging column 44 is engaged, and for the engaging column 44 to be engaged stably, the engaging column 44 is required to be in the shape of a large top and a small bottom, and the shape of the engaging hole 583 is required to fit the outer surface of the engaging column 44 so that the two symmetrical engaging holes 583 completely enclose the engaging column 44 to become engaged, and to avoid the dropping of the quick-cleaning member.

The actual working process of the controller 512 and the engaging member 511 is as follows: pressing the controlling member 55 to deform the controlling spring 56 to accumulate the reset force, and at the same time pushing the engaging member 511 down simultaneously via the connecting rod 551 until the two engaging teeth 58 at the bottom protrude beyond the lower surface of the lifting rod 5, and at this time, because the engaging teeth 58 are not limited by the inner wall of the lifting rod 5, under the supporting force of the engaging spring 59, the two engaging teeth 58 become in a state of being separated from each other to reveal the engaging hole 583 between them, the state is formed based on that the hinge head 581 is connected to the hinge member 57 by a pin 513, that is, this state is due to the rotation at the axis of the pin 513, therefore, it is possible to avoid the dropping of the engaging spring 59 because the lower opening that matches the lifting rod 5 is opened too wide due to the supporting force of the engaging spring 59. At this time, placing the engaging column 44 of the quick-cleaning member 4 between the engaging teeth 58 which are separately positioned at left and right, and then releasing the controller 512, the controller 512 is reset under the elastic force of the spring, driving the engaging member 511 to rise up and to be contained into the lifting rod 5 again, so that the quick-cleaning member 4 is engaged. The disassembly is even more convenient when the control member 55 is pressed down until the engaging teeth 58 become positioned separately at left and right, under the driving force of gravity, the quick-cleaning member 4 falls down directly and the disassembly operation is completed, the whole process is smooth and stable, and the purpose to be achieved by this application is quickly achieved.

Preferably, a drain panel 6 is provided on the upper surface of the drain body 1, and the drain panel 6 is provided with a quick-cleaning hole 61 located above the quick-cleaning mechanism 400, and the quick-cleaning hole 61 is larger in area than the quick-cleaning mechanism 400, so that the quick-cleaning mechanism 400 is able to be taken out directly through the quick-cleaning hole 61.

Embodiment 5 is basically the same as embodiment 3, the differences are as follows: Specifically as shown in FIGS. 19-22, the top of the lifting rod 5 is provided with a decorative cover 7 matching the quick-cleaning hole 61 when the quick-cleaning mechanism 400 is placed in the drain core 2, the decorative cover 7 is positioned in the quick-cleaning hole 61 and the upper surface of the decorative cover 7 is flush with the upper surface of the drain panel 6, the decorative cover 7 is provided with an operating hole 71, and more preferably, the operating hole is provided with a pushing block, the pushing block is embedded in the operating hole and can slide in the operating hole, the controller 512 is located below the decorative cover, the lower end of the pushing block is arranged as an inverted triangle, the bottom of the pushing block matches the top end of the controller 512, the pushing block controls the controller 512 to conduct operations.

In this embodiment, the controller 512 is completely covered by the decorative cover 7 so that no structure protruding from the drain panel 6 will be formed, Via the pushing block 72 provided in the operating hole 71 with a planar top the operation is performed, by pushing the pushing block 72, the inverted triangular structure at the bottom of the pushing block 72 presses the top of the controlling member 55, forcing the controlling member 55 to move downward, when the pushing block 72 is pushed to the end, the engaging teeth 58 also arrive at the position corresponding to the disassembled state, when the engaging teeth 58 are to be closed, simply resetting the push block 72 is required, and the controlling member 55 will be reset under the elastic force of the spring for closing, a further benefit of this embodiment is that the opening time of the engaging teeth 58 can be controlled by the pushing block 72, so that the engaging teeth 58 do not need to be pressed for a long period of time in order to keep them open, making it easier and quicker to use.

The above is merely a preferred embodiment of the present disclosure and is not intended to limit the present disclosure which may be subject to various modifications and variations for those skilled in the art. Any modification, equivalent replacement, improvement, etc. made within the spirit and principle of the present disclosure should be included in the scope of protection of the present disclosure, to make it easier and quicker to use.

The invention claimed is:

1. A quick-cleaning drain for quick replacement of cleaning parts, wherein said quick-cleaning drain comprises a drain body, said drain body is provided with a quick-cleaning mechanism which is quickly removable, said quick-cleaning mechanism matches a draining channel of said drain body, said quick-cleaning mechanism comprises a quick-cleaning member and a lifting rod, said quick-cleaning member matches said draining channel for draining water and blocking debris in the water, the upper surface of said quick-cleaning member is provided with a connecting end, and the bottom of said lifting rod is provided with an engaging end matching said connecting end; one of said connecting end and said engaging end is provided with a magnet, the other is provided with a magnet or a magnetically attractable part, and said engaging end is removably fixed to said connecting end through magnetic connection.

2. The quick-cleaning drain according to claim 1, wherein said quick-cleaning drain further comprises a drain core, said drain core is embedded in the draining channel of said drain body, and said quick-cleaning mechanism is provided in a cavity in said drain core and is quickly removable from said drain core.

3. The quick-cleaning drain according to claim 2, wherein the cavity in said drain core is provided with a drain basket, said drain basket matches said draining channel, said quick-cleaning mechanism is movably provided in said drain basket and matches on the bottom of the inner surface of said drain basket, and said quick-cleaning mechanism matches said drain basket for draining water.

4. The quick-cleaning drain according to claim 3, wherein the top wall, the side wall and the bottom wall of said drain basket are all provided with draining holes; and/or
the top of said drain basket is provided with a handle.

5. The quick-cleaning drain according to claim 1, wherein said lifting rod is hollow inside and mounted with an aromatherapy bar, said aromatherapy bar is removably fixed in said lifting rod, and said lifting rod is provided with opening holes for odor of said aromatherapy bar to come out.

6. The quick-cleaning drain according to claim 5, wherein the upper surface of said drain body has a drain panel, said drain panel is provided with a quick-cleaning hole provided above said quick-cleaning mechanism, said quick-cleaning hole is larger in area than said quick-cleaning mechanism to enable said quick-cleaning mechanism to be removed directly through said quick-cleaning hole, the top of said lifting rod is provided with a decorative cover matching said quick-cleaning hole; when said quick-cleaning mechanism is mounted in said drain body, said decorative cover is provided in said quick-cleaning hole and is provided with opening holes for the odor of said aromatherapy bar to come out.

7. A quick-cleaning drain for quick replacement of cleaning parts, wherein said quick-cleaning drain comprises a drain body, said drain body is provided with a quick-cleaning mechanism which is quickly removable, said quick-cleaning mechanism matches a draining channel of said drain body, said quick-cleaning mechanism comprises a quick-cleaning member and a lifting rod, said quick-cleaning member matches said draining channel for draining water and blocking debris in the water, the upper surface of said quick-cleaning member is provided with a connecting end, and the bottom of said lifting rod is provided with an engaging end matching said connecting end; said connecting end is a convex column protruding from the upper surface of said quick-cleaning member, and said engaging end is a cavity in the bottom of said lifting rod matching said convex column.

8. The quick-cleaning drain according to claim 7, wherein said convex column has an engaging rail surrounding the axis of said convex column, and the side wall of said cavity is provided with an engaging groove matching said engaging rail.

9. The quick-cleaning drain according to claim 8, wherein said quick-cleaning drain further comprises a drain core, said drain core is embedded in the draining channel of said drain body, and said quick-cleaning mechanism is provided in a cavity in said drain core and is quickly removable from said drain core.

10. The quick-cleaning drain according to claim 9, wherein the cavity in said drain core is provided with a drain basket, said drain basket matches said draining channel, said quick-cleaning mechanism is movably provided in said drain basket and matches on the bottom of the inner surface of said drain basket, and said quick-cleaning mechanism matches said drain basket for draining water.

11. The quick-cleaning drain according to claim 10, wherein the top wall, the side wall and the bottom wall of said drain basket are provided with draining holes; and/or
the top of said drain basket is provided with a handle.

12. The quick-cleaning drain according to claim 9, wherein said lifting rod is hollow inside and mounted with an aromatherapy bar, said aromatherapy bar is removably fixed in said lifting rod, and said lifting rod is provided with opening holes for odor of said aromatherapy bar to come out.

13. The quick-cleaning drain according to claim 12, wherein the upper surface of said drain body has a drain panel, said drain panel is provided with a quick-cleaning hole provided above said quick-cleaning mechanism, said quick-cleaning hole is larger in area than said quick-cleaning mechanism to enable said quick-cleaning mechanism to be removed directly through said quick-cleaning hole, and the top of said lifting rod is provided with a holding part for holding.

14. A quick-cleaning drain for quick replacement of cleaning parts, wherein said quick-cleaning drain comprises a drain body, said drain body is provided with a quick-cleaning mechanism which is quickly removable, said quick-cleaning mechanism matches a draining channel of said drain body, said quick-cleaning mechanism comprises a quick-cleaning member and a lifting rod, said quick-cleaning member matches said draining channel for draining water and blocking debris in the water, the upper surface of said quick-cleaning member is provided with a connecting end, and the bottom of said lifting rod is provided with an engaging end matching said connecting end; said connecting end is an engaging column provided on the upper surface of said quick-cleaning member, said lifting rod is hollow inside and embedded with an engaging mechanism, said engaging mechanism comprises an engaging member and a controller, said engaging member is provided in the bottom of said lifting rod for selectively engaging or unengaging said engaging column, and said controller is provided in said lifting rod for controlling the engaging or unengaging of said engaging member.

15. The quick-cleaning drain according to claim 14, wherein a support ring is provided at the inner wall of said lifting rod, said controller is mounted to said support ring and extends downwardly from said support ring for connecting to said engaging member, said engaging member comprises two symmetrically arranged engaging teeth and a hinge member, the upper end of each said engaging tooth is provided with a hinge head, the two said hinge heads respectively on each of the two said engaging teeth are staggered from each other and are fixed to the hinge member using a pin, each of said two hinge heads has a limiting hole and an engaging hole on its surface facing to the other, two said limiting holes are embedded with an engaging spring, and two said engaging holes match and enclose said engaging column.

16. The quick-cleaning drain according to claim 15, wherein said controller comprises a controlling member and a controlling spring, said controlling spring is embedded between said controlling member and said support ring and is supported by said support ring, a connecting rod extending towards said support ring is provided in the center of said controlling member, the bottom of said connecting rod is fixedly connected to the top of said hinge member, said controlling member is embedded in and is partially outside of said lifting rod and said controlling spring supports said controlling member to reset after being pressed down in said lifting rod.

17. The quick-cleaning drain according to claim 16, wherein said drain body is provided with a drain panel on the upper surface, said drain panel is provided with a quick-cleaning hole located above said quick-cleaning mechanism, said quick-cleaning hole is larger in area than said quick-cleaning mechanism, said quick-cleaning mechanism is removable directly through said quick-cleaning hole, the top of said lifting rod is provided with a decorative cover matching said quick-cleaning hole, when said quick-cleaning mechanism is installed in said drain body, said decorative cover is located in said quick-cleaning hole, said decorative cover is provided with an operating hole and said controller conducts operations through said operating hole.

18. The quick-cleaning drain according to claim 17, wherein said operating hole is provided with a pushing block, said pushing block is embedded in said operating hole and can slide in said operating hole, said controller is located below said decorative cover, the lower end of said pushing block is arranged as an inverted triangle, the bottom of said pushing block matches the top end of said controller, said pushing block controls said controller to conduct operations.

19. The quick-cleaning drain according to claim 14, wherein said quick-cleaning drain further comprises a drain core, said drain core is embedded in the draining channel of said drain body, and said quick-cleaning mechanism is provided in a cavity in said drain core and is quickly removable from said drain core.

20. The quick-cleaning drain according to claim 19, wherein the cavity in said drain core is provided with a drain basket, said drain basket matches said draining channel, said quick-cleaning mechanism is movably provided in said drain basket and matches on the bottom of the inner surface of said drain basket, said quick-cleaning mechanism matches said drain basket for draining water, and the top wall, the side wall and the bottom wall of said drain basket are all provided with draining holes; and/or the top of said drain basket is provided with a handle.

* * * * *